May 23, 1967 R. Z. FOWLER ET AL 3,321,639
DIRECT COUPLED, CURRENT MODE LOGIC
Filed Dec. 3, 1962 3 Sheets-Sheet 1

Inventors:
Robert Z. Fowler,
Edgar W. Seymour,
by D. T. Ready
Their Agent.

DIRECT COUPLED, CURRENT MODE LOGIC

Filed Dec. 3, 1962 3 Sheets-Sheet 2

Inventors:
Robert Z. Fowler,
Edgar W. Seymour,
by S. T. Ready
Their Agent.

Inventors:
Robert Z. Fowler,
Edgar W. Seymour,
by D. T. Body
Their Agent.

United States Patent Office 3,321,639
Patented May 23, 1967

3,321,639

DIRECT COUPLED, CURRENT MODE LOGIC

Robert Z. Fowler, Ithaca, and Edgar W. Seymour, Freeville, N.Y., assignors to General Electric Company, a corporation of New York Filed Dec. 3, 1962, Ser. No. 241,965
4 Claims. (Cl. 307—88.5)

This invention relates to electronic logic circuitry, and more particularly to a transistor circuit used as a universal operator circuit in the implementation of digital data processing systems. It is particularly useful for circuits which are packaged or constructed with thin film or solid circuit techniques and in the implementation of circuit redundancy.

One of the requirements of computers is that the size and weight be as small as possible while satisfactory reliability and performance characteristics are maintained. As more complex computers are built, the increased number of component parts used produces a size and weight penalty that becomes excessive, especially for military applications. Manufacturers of electronic equipment have developed new circuit fabrication techniques which produce circuits greatly reduced in size compared with the prior art conventionally constructed circuits. Such techniques include those in the microminiaturization area such as thin films obtained by vapor deposition as well as the solid circuits such as those constructed with single crystal silicon or by epitaxial growth.

The use of these new circuit fabrication techniques has necessitated the highlighting of certain considerations in circuit design. For instance, it is desirable to use as few component part types as possible. Those used should preferably be the types simplest to construct using the new fabrication techniques. Practical techniques enable the fabrication of large numbers of electronic components simultaneously. This results in drastic changes in the practicality and costs in micro-electronic fabrication as opposed to conventional fabrication by the assembly of individual electronic components. With micro-electronic techniques for producing a number of transistors for a given circuit, the addition of more transistors is much simpler and less costly than the use of a different kind of component. For these reasons it is highly desirable to minimize the kinds of components used and thereby minimize the number of fabrication steps required.

An important consideration in the design of any digital computer, whether for commercial or military applications, is speed of operation. It is usually desirable to operate at high speed resulting, as speed increases, in decreases in the cost per computation. In real-time applications such as in missile guidance systems, problems must be solved in a time period that is short compared with the response time of the missile. In these applications high speed is a definite requirement.

Two ways to obtain high speed of operation are to run many functions in parallel and to use circuits that operate at high speed. The operation of functions in parallel has the disadvantage of requiring additional component parts which increase size, weight, and power consumption. The use of high speed operation circuits eliminates these problems provided the complexity required for high speed does not also result in a large number of additional component parts.

There are several reasons for keeping the power required to operate a computer at a minimum. For example commercial computers may consume kilowatts of power. Usually an air conditioner is utilized to handle this power, and its use results in increased operating costs. Considering military applications, only a limited amount of power is available; and it is desirable to keep requirements as low as possible. Generally speaking, the power requirement of a digital computer is directly proportional to the speed of the circuits run. Since high speed and low power are both wanted, it is important to have a high speed to power ratio.

A problem associated with a high speed to power ratio is that as it is increased the circuitry becomes more sensitive to noise. This is because for this condition the designer is forced to low voltage level signaling and the circuits are susceptible to being triggered by relatively low level noise voltages.

It is always desirable to have reliably operating equipment. In military applications it is necessary that high reliability be maintained in equipment used. There are many reasons for this most of which are self evident and will not be gone into in detail in this application. There are two areas in which reliability may be obtained: First it may be obtained by using better parts and circuits which have higher tolerance to variations in component part parameters and second it may be obtained by equipment redundancy or by logic function or logic circuit redundancy wherein more than one means is provided for accomplishing a given function. The lower the circuit level at which redundancy is achieved, the better the resulting reliability. Hence it is desirable to implement redundancy at the lowest practical circuit level. The requirement for redundancy enhances the value of having a majority logic type circuit available. Such a circuit provides redundancy at the individual circuit level and makes possible voting at this level.

A primary cause of difficulties in implementing majority logic circuitry is that the increase in the number of signals applied to an active device increases the variation in the net applied signal which requires the active device to be less sensitive to input signal variations. With the addition of the difficulties in micro-electronic fabrication and in component capabilities, majority logic has not been feasible with micro-electronic circuits.

Accordingly, it is an object of this invention to provide a logic circuit adapted for micro-electronics which does not require closely matched components.

It is a further object of the invention to provide majority logic circuits suitable for micro-electronics which are substantially insensitive to ordinary noise in the circuit.

It is a further object of the invention to provide a micro-electronic circuit of general utility which requires only two kinds of components without requiring closely matched transistors.

In accordance with this invention, a novel circuit configuration provides a novel way to process digital signals synchronously from circuit to circuit in a digital logic system. A digital signal and its complement is inserted in a direct coupled transistor flip-flop pair through a differential transistor amplifier, the operation of which is controlled by clock pulses applied to the common emitter. The arrangement is made so that the logic circuit is responsive to the relative applied signal levels rather than the absolute signal level because of the combined effects of low impedance circuitry, clock signal drive, and direct connection of the input signals to the bases of emitter-coupled gating transistors greatly reduce circuit noise effects and insures more reliable performance.

The circuit is particularly well adaptable for the implementation of redundant logic systems.

The invention, together with further objects and advantages thereof, may best be understood by referring to the following description taken in conjunction with the appended drawings in which like numerals indicate like parts and in which.

Figure 1:
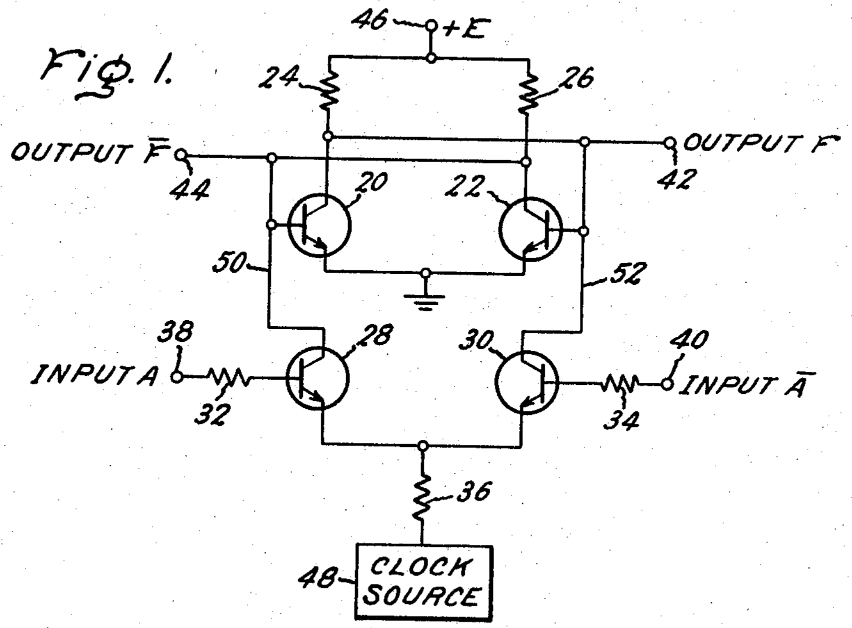
FIGURE 1 is a schematic drawing of one embodiment of the invention.

Referring now to the drawings and more particularly to FIGURE 1 there is shown a schematic diagram of one embodiment of the invention. As shown therein a pair of transistors 20 and 22 are connected such that they form a bistable direct coupled multivibrator. Transistor 20 has an input applied on line 52 to the base. The collector terminal of transistor 20 is connected serially with resistor 24 to a terminal 46 which is attached to a source of voltage E. In a similar manner the collector of transistor 22 is connected serially with resistor 26 to terminal 46. The input to transistor 22 is supplied to its base and is taken from line 52. The base of transistor 20 is connected directly to the collector of transistor 22, while the base of transistor 22 is connected directly to the collector of transistor 20. The output from transistor 22 is taken from the collector and is applied to output terminal 44 and as shown is labeled output F. In a similar manner the output from transistor 20 is applied to output terminal 42 and as shown is labeled OUTPUT $\overline{F}$.

In the lower half of the drawing of FIGURE 1 are shown a second pair of transistors 28 and 30. These transistors have their emitters connected together, and the common emitters are connected serially through a resistor 36 to clock source 48 which supplies the clock input voltage signal. The input terminal 38, which as shown accepts a voltage INPUT A, is connected to a resistor 32 which is in turn connected to the base of transistor 28. In a similar fashion input terminal 40, which as shown is equipped to accept a voltage INPUT $\overline{A}$, is connected to a resistor 34 which in turn is connected to the base of transistor 30. The output from transistor 28 is applied over lead 50 to the base of transistor 20 as hereinbefore mentioned. The output from transistor 30 is connected by lead 52 to the input or the base of transistor 22 as hereinbefore mentioned.

The multivibrator comprising transistors 20 and 22 and resistors 24 and 26 is a conventional direct coupled bistable circuit which performs the storage function. The multivibrator is set into the desired state by the application of a clock input voltage applied through one of two halves of a differential amplifier comprising transistors 28 and 30 together with their associated resistors 32, 34, and 36 which performs the gating function.

A clock voltage input is applied to the common emitters of transistors 28 and 30 of the differential amplifier gate circuit from source 48 and resistor 36. This clock pulse may be any one of many types of clock voltages such as are commonly used to gate digital type logic circuitry. One such type is a sine wave clock which has the advantage of being easy to generate. For purposes of this description, assume that a sine wave clock is used.

The sinusoidal clock is, however, much to be preferred for most applications. If the sine closck is used, the flip-flops can tolerate gross clock overdrive that is three times, or more, the minimum trigger voltage. At high frequencies, the distribution of clock signals is significantly simplified by minimizing the required bandwidths and thus reducting the effects of wiring reactances. Elimination of fast wave fronts is of importance in minimizing the noise induced in adjacent wires and on ground. The generation of two-phase sinusoidal clock is very simply accomplished. Ordinary sine wave oscillators and center-tapped pulse transformers are generally satisfactory in the circuit. Because the load on the clock lines is substantially resistive and is constant, distribution of clock can be accomplished with terminated lines if desired. This can be particularly useful at the relatively high frequencies at which the circuitry will operate.

In addition to the clock pulse applied to the common emitters, and bipolarity input voltage signals, INPUT A, and its complement, INPUT $\overline{A}$, are applied to terminals 38 and 40, respectively, and thence via resistors 32 and 34 to the bases of transistors 28 and 30.

During the period when the clock pulse is negative a current is available, and either transistor 28 or transistor 30 will conduct depending on which of the bases has the more positive voltage applied to it. If the base of transistor 28 is more positive than that of transistor 30, transistor 28 will conduct essentially all the current. This current develops a voltage across resistor 26 of a magnitude to cause transistor 20 to be non-conducting and consequently no output is obtained at terminal 42. Transistor 22 will be conducting and an output $\overline{F}$ will be obtained at terminal 44. The complement or OUTPUT F appears at terminal 42. This condition, wherein transistor 20 is non-conducting and transistor 22 is conducting is defined, for purposes of this explanation, as the "1" state of the multivibrator. The multivibrator will remain in the "1" state until the voltages at the bases of transistors 28 and 30 have relative polarities such that transistor 30 conducts. If the base of transistor 30 is the more positive one during the negative portion of the clock input, transistor 30 conducts the current, transistor 22 is non-conducting, transistor 20 will conduct, and the multivibrator will be reset to the zero state.

The circuit places no unusual restrictions on the transistors or resistors. Accordingly, micro-electronic circuit fabrication techniques generally can be directly applied. For example, resistors and interconnections can be formed as thin-film parts on a suitable substrate and the semiconductors attached by pressure bonding. Also, active and passive components can all be formed on a single chip by diffusion processes and the chip is then conveniently mounted in a conventional transistor header.

Figure 2:
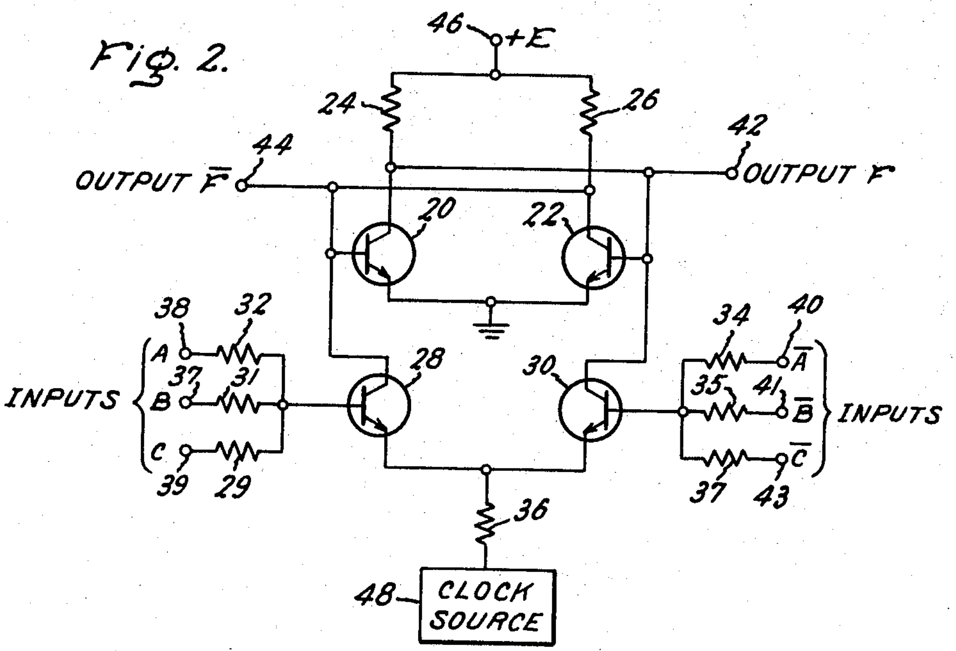
FIGURE 2 is a schematic drawing of a second embodiment of the invention which incorporates the majority gate feature.

In the FIGURE 2 circuits, fan-in is essentially unlimited and fan-out is limited primarily by the beta of the transistor. For most applications maximum fan-out can be safely considered to be beta minimum divided by 3. For example, if the minimum beta of the transistor used is 30 at the lowest operating temperature, the maximum fan-out permitted is 10.

Referring now to FIGURE 2 there is shown a second embodiment of the invention which is a majority logic circuit. This embodiment is quite similar to the embodiment of FIGURE 1. Additions to this embodiment are an additional pair of resistors connected in the input circuitry of each of the transistors 28 and 30 in the gating circuit. Resistors 29 and 31 are connected respectively between input terminals 39 and 37 and the base of transistor 28; and resistors 35 and 37 are connected respectively between input terminals 41 and 43 and the base of transistor 30. Basically the operation of the embodiment of FIGURE 2 is quite similar to the operation of the circuit of FIGURE 1. Either transistor 28 or 30 conducts virtually all the current during the negative portion of the clock input which is applied to terminal 48. The transistor having the more positive voltage at its base conducts the current.

The additional resistors or the embodiment of FIGURE 2 are used to make the circuit a majority logic type circuit as hereinbefore mentioned. The voltage appearing at the respective bases of the transistors 28 and 30 are the sums of the input voltages to terminals 37, 38, 39, for transistor 28 and the terminals 40, 41, and 43 for transistor 30. It is to be observed that inputs A, B, C as shown are the complements of inputs $\overline{A}$, $\overline{B}$, and $\overline{C}$ as shown. To obtain the voltage level required to turn on the transistors, at least two of the desired input voltages must be applied at input terminals 37, 38, and 39 and consequently at terminals 40, 41, and 43. Thus a voting function is implemented or the direct coupled multivibrator is set in a state representative of the majority of the inputs to the input terminals of the differential amplifier gating circuit.

An important advantage of this majority logic circuit shown in FIGURE 2 over that of the prior art is that this is the first majority logic circuit configuration which makes it possible to construct a circuit using available component parts. Heretofore, circuit configurations for the majority logic function have been realized; but it has been most difficult, considering the state of the art of available components parts such as resistors and transistors, to actually build the circuit. It will be realized by those skilled in the art that any odd number of inputs may be utilized in the majority gating function. For example, instead of a three-input majority gate, a five-input, a seven-input or even a nine-input gate could be used.

It is also important to note that neither the embodiment of FIGURE 1 nor the embodiment of FIGURE 2 employs reactive elements. Two component types are used—transistors and resistors. This feature makes it easy to build the circuits using thin film or solid circuit techniques hereinbefore mentioned.

Figure 3:
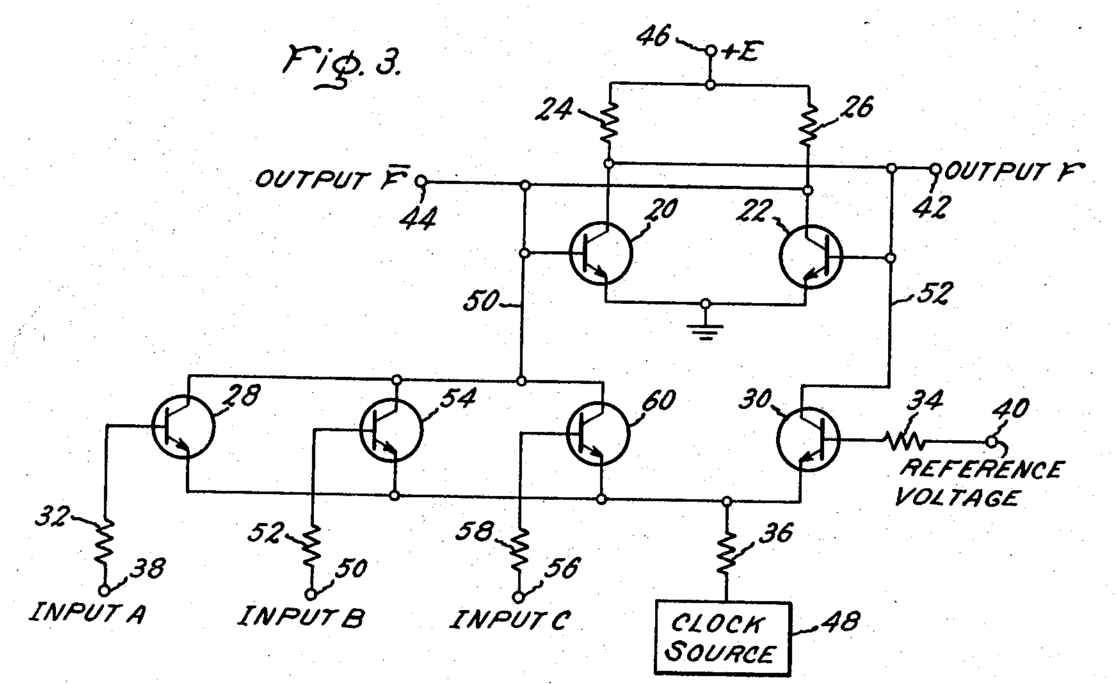
FIGURE 3 is a schematic drawing of a third embodiment of the invention.

Reference is now made to FIGURE 3 wherein there is shown a schematic diagram of a third embodiment of the invention. This embodiment illustrates a particular type of circuit which utilizes the principles of this invention. The circuit of FIGURE 3 uses a three-input OR gate circuit to set the bistable multivibrator in the desired state. Differences between the embodiments of FIGURES 1 and 3 are the addition in the circuit of FIGURE 3 of transistor 54 with its associated base circuit resistor 52 and input terminal 50 connected thereto and transistor 60 with its associated base circuit resistor 58 and input terminal 50 connected thereto and transistor 60 with its associated base circuit resistor 58 and input terminal 56 connected thereto.

A further difference between the embodiment of FIGURE 3 and the other embodiments hereinbefore discussed is that instead of applying the complement of the input voltage signal to one side of the gate circuit, a reference voltage is applied to that side. As illustrated, a reference voltage is applied to terminal 40. It will be realized by those skilled in the art that a reference voltage may be applied to one side of the differential amplifier gate circuit in any embodiment at the discretion of the circuit designer. In some applications the input signal complement is more readily available than the reference voltage. Also, the use of a signal and its complement gives twice the difference between base voltages when they are compared as does the comparison of a signal with a fixed reference voltage. Consequently much greater component part parameter variations can be tolerated.

If there are problems in interconnections between circuits or stages, such as in micro-packaging wherein interconnection wiring is a problem, it is frequently desirable to use a reference voltage applied to one input of the gate circuit. If a reference voltage is applied to each gate circuit, only one interconnection between circuits is required. It will be realized by those skilled in the art that the principle of operation of the gating circuit is the same whether a reference or a complement of the input signal is applied to one side of the differential amplifier.

In the operation of the embodiment of FIGURE 3, if either INPUT A, INPUT B, or INPUT C is more positive than the reference voltage applied to terminal 40, the current will be steered through the gating circuit such that the multivibrator comprising transistors 20 and 22 and resistors 24 and 26 will be in the "1" state. Otherwise, the multivibrator will be in the zero state.

It will be apparent to those skilled in the art of digital circuit design that other kinds of circuits such as AND gates, AND/OR gates and any of the other commonly known digital circuits are readily implementable using the principles of operation of this invention. The majority voting illustrated in the embodiment of FIGURE 2 could be incorporated in any of the circuits by modifying the input to the gating circuit as illustrated and described.

Figure 4:
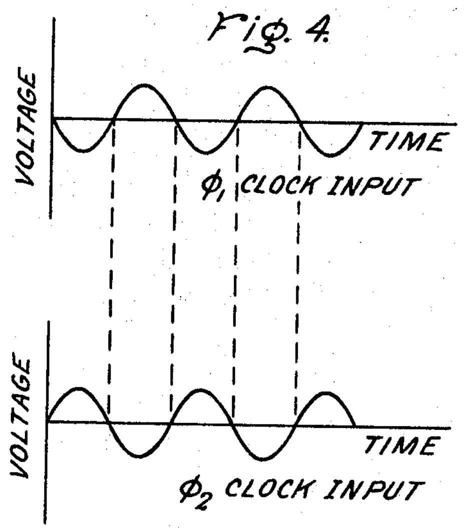
FIGURE 4 illustrates typical waveforms of the two-phase clock signal used in the invention.

Phase 1 ($\phi_1$) and phase 2 ($\phi_2$) clock input pulse wave forms shown in FIGURE 4 are representative of the two phase clock pulses applied to the clock input terminal of successive differential amplifier gating circuits. Two phase clocks are well known and their operation is understood by those skilled in the art of digital logic circuits. As used in this invention the two are 180° out of phase and are used to insure the delay between successive logic stages. This will perhaps be better understood when the two clock pulses shown in FIGURE 4 are considered in conjunction with the shift register stage shown in FIGURE 5.

Figures 5, 6:
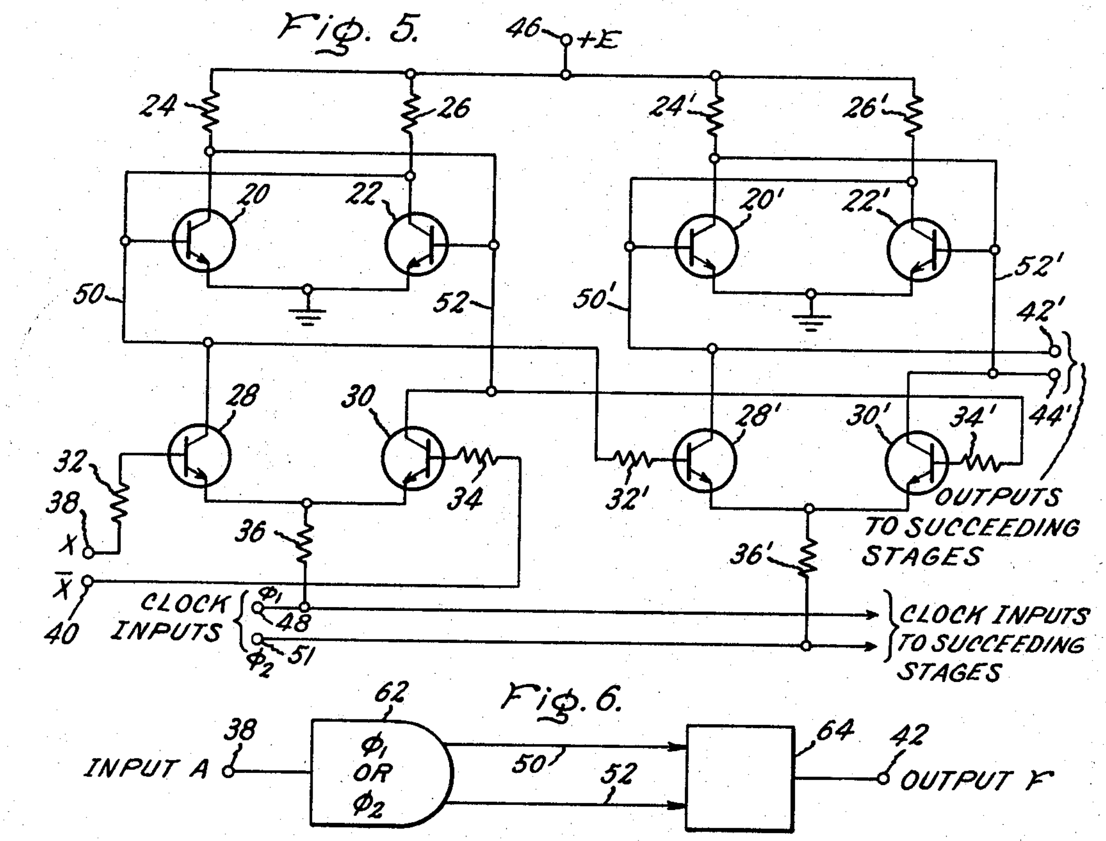
FIGURE 5 is a schematic drawing of a shift register stage which uses this invention.
FIGURE 6 illustrates symbols used to represent portions of the invention.

The circuit of FIGURE 5 is a shift register stage comprised of two like basic circuits such as that shown in the embodiment of FIGURE 1. The first half of the stage comprises a differential amplifier and a direct coupled transistor multivibrator which accepts a clock input $\phi_1$ voltage such as is shown in FIGURE 4. The second half of the shift register stage is a multivibrator identical to that in the first half of the stage and comprising transistors 20' and 22' and resistors 24' and 26' and having output terminals 42' and 44'. The gating circuitry for this multivibrator is a differential amplifier comprising transistors 28' and 30' and resistors 32', 34' and 36'. The voltages appearing at the output terminals of the multivibrator of the first half of the stage are applied to inputs of the gate circuit of the second half of the stage. At the same time that the first half of the stage accepts the $\phi_1$ input pulse the second half of the stage accepts a $\phi_2$ clock input voltage 180° out of phase with the $\phi_1$ clock pulse as shown in FIGURE 4.

In operation, during the first half cycle of the clock input, the first half of the stage is set in a state indicative of the input voltage signals X and $\overline{X}$ by the negative $\phi_1$ clock input. Since the clock input to the second half is positive during this period, it remains in the state it was previously set. During the next half cycle, the second half cycle, the second half of the stage is turned on by the negative $\phi_2$ clock input while the gate circuit of the first half is turned off by the $\phi_1$ clock input when it becomes positive. As the gate circuit in the second half of the shift register conducts, it is set in a state representative of its input voltage signals, which are the output signals from the first half of the stage.

The two phase clock insures a delay in the transfer of information between successive shift register stages of digital circuitry in which the stage of FIGURE 5 might be used. Such delays are common in digital circuitry equipment and they are sometimes obtained by the use of reactive elements between stages. Since there are no reactive elements, capacitors or inductors, in the circuit configuration of this invention, the delay between stages is achieved by using a second basic logic circuit for the second half of the register stage and the two phase clock pulses.

Another feature of the invention inherent in all embodiments is that the D.C. voltage reference level of signal information to be stored or processed in the digital equipment, such as a computer must not be restored between successive shift register stages. In other words, the output of one stage may be applied directly to the input of succeeding stages. This results in savings in component parts and consequently, as hereinbefore explained, results in savings of power consumed and in weight of equipment.

Another advantage is that the output from one stage may easily be used directly as the input to several succeeding stages.

Refer now to FIGURE 6 wherein there are shown symbols for various parts of the circuitry of embodiments of this invention. As shown, 62 represents the differential amplifier gating circuit while 64 represents the bistable multivibrator. When used, the symbol for the gating circuit 62 will be labeled $\phi_1$ or $\phi_2$ to indicate which phase of clock input it accepts. The symbols shown in FIGURE 6 are portraying the conditions in which a reference voltage is applied to one of the input terminals of the transistor differential amplifier gating circuit. Only one input, INPUT A is shown. This corresponds to INPUT A which is applied to terminal 38 in FIGURE 1. The outputs from the gating circuit are applied on lines 50 and 52, which correspond to lines 50 and 52 respectively of the embodiment of FIGURE 1 and of the other embodiments shown herein, and are applied to the multivibrator 64. The output voltage F from multivibrator 64 appears on output terminal 42. This output would be applied to the gating circuit succeeding gating circuit 62. Since it has been assumed that this gating circuit is also accepting an input voltage reference to one half of the differential amplifier then only one input will be required; consequently, only one output is shown from the multivibrator 64.

Figure 7:
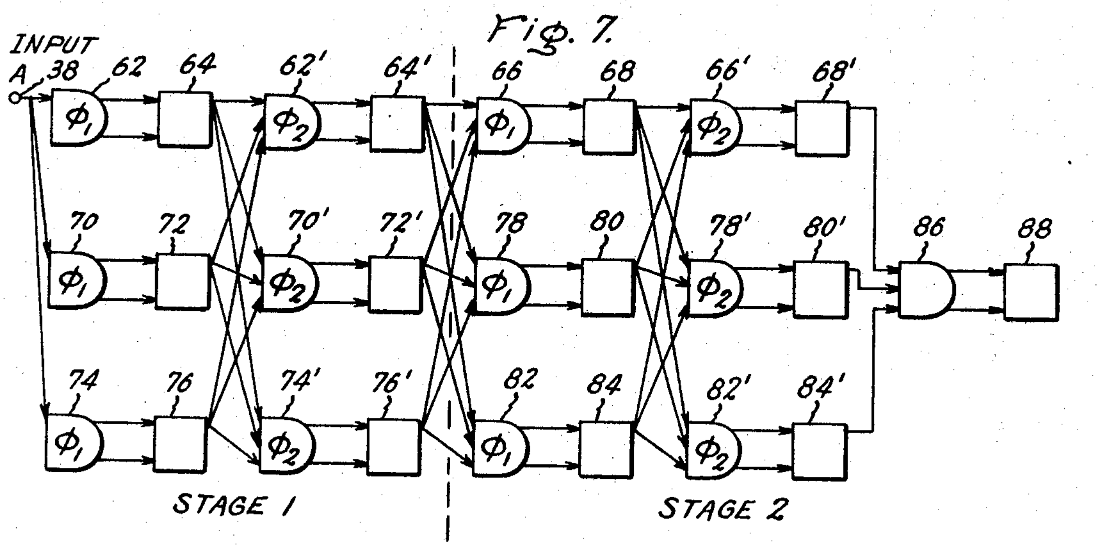
FIGURE 7 is an illustration of a two-stage redundant shift register drawn utilizing the symbols of FIGURE 6.

In FIGURE 7 there is shown a logic diagram of a two stage redundant shift register. An input A is applied to terminal 38 and then to each of three differential amplifier gating circuits 62, 70, and 74. As indicated in the logic diagram each of the gating circuits accepts or is controlled by the $\phi_1$ clock pulse. Outputs from gating circuit 62, 70, and 74 are applied to multivibrators 64, 72, and 76 respectively. The output from each of the multivibrators is applied as in input voltage signal, to each of the $\phi_2$ differential amplifier gating circuits 62′, 70′, and 74′. The output from the $\phi_2$ gating circuits 62′, 70′, and 74′ are applied respectively to direct coupled multivibrators 64′, 72′, and 76′. As shown, majority voting is achieved at the inputs to each of the transistor differential amplifier gating circuits 62′, 70′, and 74′. There can be a failure in any one of the vertical columns and the failure will not appear at the output of the second half of the stage. The same is true for all subsequent vertical columns and all subsequent stages. The output of the first stage feeds stage two which is similar to the first stage. The output from the two stages feeds 85 and 88.

With prior transistor logic techniques, particularly those using only transistors and resistors, the transistors have generally required closely matched base-emitter characteristics for proper operation of the circuit—a disadvantage aggravated by any noise on the ground leads. In the configuration of this invention, this drawback is avoided because grounded-emitter transistors are never paralleled.

This invention provides an easily implemented, high speed to power ratio, redundant logic, and consequently reliable, circuit when utilized in the construction of the computer. Many other circuit configurations are available. The basic circuit configuration is a universal operator type circuit. For instance the basic configuration could be used in the construction of an AND circuit exclusive OR circuit, and all other circuits used in the logic circuitry of a digital computer. Reliability through redundancy can be implemented in any of these circuits as is desired using the basic principles outlined or described hereinbefore. Thus these circuits are reliable as is required in many computers as hereinbefore discussed.

There are many factors contributing to the overall advantages pointed out above. These include: The specific differential amplifier insures correct logic gating because the input signals are applied to the bases of a transistor pair having their emitters directly connected to a common point. The bistable storage circuit provides uniform output signals suitable for direct connection to subsequent circuits. The circuits together place light tolerance demands on the components and signals to be processed. Since only resistors and semiconductor junctions are required, micro-electronic processes and redundant system configurations are simplified.

While the embodiments of the invention described herein have been based on the use of NPN transistors, it will be readily apparent to those skilled in the art that PNP transistors also could be used within the scope of the invention. In fact, semiconductors from the family of multiple-junction devices may be chosen by the circuit designer to fit his particular requirement.

While particular embodiments of the invention have been shown and described herein, it is not intended that the invention be limited to such disclosure. For example, other bistable circuits such as diode circuits can be used for the storage circuit and nonsynchronous operation can be achieved by the substitution of a conventional negative reference source (for NPN transistors) for the clock source. Other changes and modifications can be made and incorporated within the scope of the claims.

What is claimed is:

1. A logic circuit for processing digital signals comprising:
   (a) a first pair of transistors each having base and emitter electrodes and having their emitters directly coupled, to form a differential amplifier and receiving digital input signals at the base of at least one of said transistors;
   (b) clock means for applying synchronous pulses to the emitters of said transistors for gating; and
   (c) a second pair of transistors, interconnected as a bistable flip-flop and having one input terminal coupled to one of said transistors and another input terminal to the other of said first pair of transistors for control of the bistable state thereof in accordance with the output of said differential amplifier.

2. A logic circuit for processing digital signals comprising:
   (a) a first pair of transistors having an output, and each having base and emitter electrodes and having their emitters directly coupled to provide differential amplifier operation;
   (b) input means for directly applying bipolarity digital input signals to the base of one of said transistors and complementary signals to the other transistor base, said input means including interconnected summing resistors for producing majority voting by a plurality of input signals;
   (c) clock means for applying sinusoidal synchronizing pulses to the emitters of said transistors for gating;
   (d) a second pair of transistors interconnected to form a bistable flip-flop and
   (e) means coupling the output of said first pair of transistors to said flip-flop for controlling the state thereof in response to said input signals.

3. A shift register for processing digital signals comprising:
   (a) a first shift register half stage circuit including
      (1) a gating circuit having an output, and including a pair of transistors each having base and emitter electrodes, (2) means to apply digital input signals to the base of one of said transistors, (3) interconnection means including a direct connection between the emitters of said transistors to provide differential amplifier operation, (4) a bistable storage circuit providing output signals coupled to said pair of transistors for determining its state by the output of said gating circuit;

(b) a plurality of additional half stage circuits coupled in series with said first half stage circuit; and (c) two phase clock means for applying sinusoidal synchronous pulses to the gating transistor emitters of alternate half stages.

4. The shift register of claim 3 further comprising:

(a) (5) majority logic means, forming a part of said input means, having plural input connections for receiving a plurality of input signals and combining said signals by analog summation, at said transistor base in accordance with majority voting logic, and (d) redundant shift register half stage circuits interconnected to produce majority voting beteween half stages of the shift register.

References Cited by the Examiner

UNITED STATES PATENTS

| | | | |
|---|---|---|---|
| 3,054,910 | 9/1962 | Bothwell | 307—88.5 |
| 3,074,020 | 1/1963 | Ropiequet | 307—88.5 X |
| 3,094,632 | 6/1963 | Wartella | 307—88.5 |
| 3,165,644 | 1/1965 | Clapper | 307—88.5 |
| 3,211,921 | 10/1965 | Kaufman et al. | 307—88.5 |
| 3,215,854 | 11/1965 | Mayhew | 307—88.5 |

OTHER REFERENCES

"Microelectronics Using General Electric Emitter-Coupled Logic Operators," by E. F. Kvamme in F. G. Application Note 90.80, dated August 1962, pp. 1–19.

Marsocci, "A Survey of Semiconductor Devices and Circuits in Computers," in Semiconductor Products Ltd., January 1961; pp. 31–37 are pertinent.

ARTHUR GAUSS, *Primary Examiner.*

S. D. MILLER, *Assistant Examiner.*